Aug. 12, 1952 A. PROD'HOM 2,606,512
SAFE BOX
Filed Feb. 21, 1950
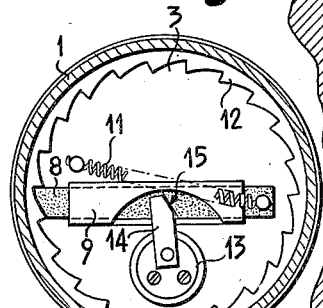
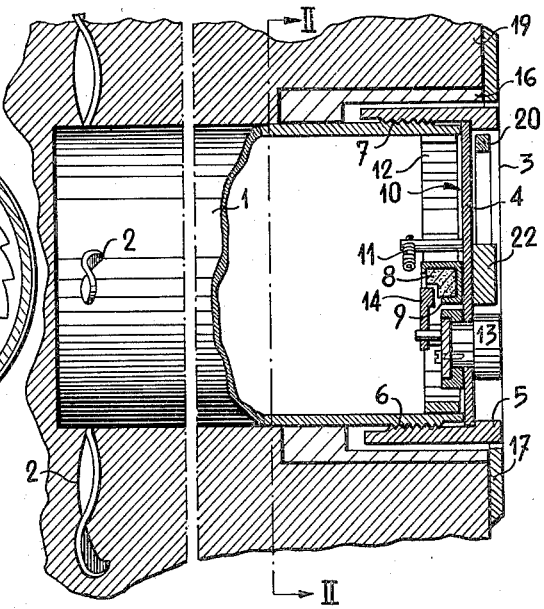
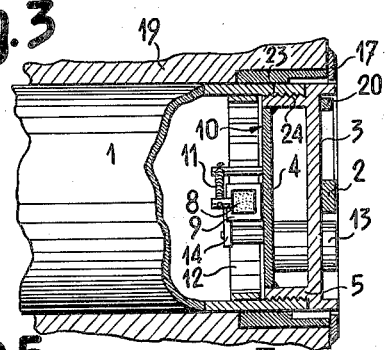
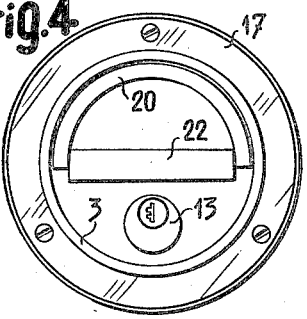
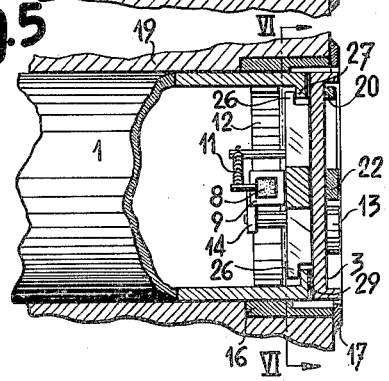
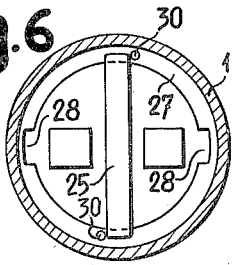
INVENTOR
Andre Prod'hom.
BY Emory L. Groff
ATTORNEY Patented Aug. 12, 1952

2,606,512

UNITED STATES PATENT OFFICE 2,606,512

SAFE BOX

André Prod'hom, Geneva, Switzerland

Application February 21, 1950, Serial No. 145,375
In Switzerland February 24, 1949

4 Claims. (Cl. 109—59)

The present invention relates to safe box comprising a body fitted with an opening closed by an element, the position of which is secured by a safety device.

This safe box differs from the known safe boxes by the fact that the body has a circular opening closed by a cover and by the fact that the safety device includes, on the one hand, a retaining device presenting elements fastened to the body and elements fastened to the cover co-operating one with another by angular displacement of the cover in one direction in relation to the body and, on the other hand, a locking device prohibiting a displacement of the cover in relation to the body in a direction opposite to that causing the engagement of the organs of the said retaining device, a releasing device being provided for, the operation of which provokes the clearing of the organs of the locking device in order to permit the removal of the cover.

The attached drawing shows schematically and by way of example a few embodiments of the safe box in accordance with the invention.

Fig. 1 is a view of a first embodiment, certain parts being shown in cross-section.

Fig. 2 is a cross-section view taken along the line II—II of Fig. 1.

Fig. 3 is a view of a second embodiment, certain parts being shown in cross-section.

Fig. 4 is a front view of same, the cover being in position on the body.

Fig. 5 is a view of a third embodiment, certain parts being shown in cross-section.

Fig. 6 is a cross-section view taken along the line VI—VI of Fig. 5.

According to Figs. 1 and 2 of the attached drawing, the safe box comprises a body 1 of tubular shape and carrying anchoring lugs 2. This body 1 includes a circular opening closed by a cover 3. The latter is constituted by a circular plate 4 rigidly fastened inside a tube 5. A retaining device constituted, on the one hand, by a tapping 6 of the tube 5 and, on the other hand, by a thread 7 of the tubular body 1 makes it possible to fasten the cover 3 on the opening of the body 1 and to close the latter.

A locking device constituted by a one way coupling connecting mechanically the cover to the body prohibits an untimely opening of the safe box. The coupling includes, on the one hand, a lock bolt 8 subjected to the action of a spring 11 and sliding into a guide 9 rigidly fastened on the back face 10 of the cover 3 and, on the other hand, a ratchet 12 fastened to the inside wall of the tube 1. This ratchet and the lock bolt are arranged in such a manner as to permit a revolving of cover 3 in the direction of screwing on the body 1, but to prohibit an angular displacement of this cover in the opposite direction.

A releasing device makes it possible to clear the lock bolt 8 from the ratchet 12 and, therefore, to remove the cover 3 by unscrewing it.

This releasing device comprises a cylinder lock 13 fastened to the plate 4 and of which the revolving part carries a lever 14 co-operating with a supporting face 15 provided on the lock bolt 8.

As shown on the drawing, the tube 1 is sealed in a wall 19 and carries a protective socket 16, covered by a fitting 17 constituted by a ring fixed to the wall 19. Cover 3 carries also an operating organ 20 constituted by a handle articulated on a bar 22 rigidly fastened on the front face of plate 4.

The working of the above described safe box in reference to Figs. 1 and 2 of the attached drawing is as follows:

When the safe box is closed, its organs and elements are in the relative positions shown on Figs. 1 and 2. It will be noted that it is impossible to remove cover 3 because the lock bolt 8, the end of which is engaged in the ratchet 12, prohibits any revolving of this cover in the direction of unscrewing.

Moreover, the tube 1 being sealed in the wall 19, it is impossible to release it by a pull exerted on the operating organ 20.

In order to remove cover 3, it is necessary to introduce a key into the cylinder lock 13 and to impart a rotation to the cylinder of said lock. The end of lever 14, then co-operating with the supporting face 15, displaces the lock bolt against the action of its return spring 11. The lock bolt is thus brought into a position in which it is out of reach of the ratchet 12. Thereafter, the user can, after having lifted the operating organ 20, unscrew the cover 3 and remove it.

In order to close the safe box, it is sufficient to engage cover 3 on tube 1 and to screw it on the latter after having previously brought the cylinder of the lock 13 back to its primitive position, that is to say in the position in which the key can be removed from the lock and in which lever 14 is out of reach of the supporting face 15. During the placing of the cover 3 on the tube 1, the lock bolt 8, subjected to the action of its return spring 11, jumps from tooth to tooth.

In the embodiment in accordance with Figs. 3 and 4, the safe box has the same organs and elements as the above described ones in reference to Figs. 1 and 2, however, the tube 1 comprises a tapping 23 with which co-operates a thread 24 of the cover 3. By examining these figures, it is easy to see that the placing and removing of cover 3 take place exactly in the same manner as those described above in reference to the Figs. 1 and 2.

In the embodiment in accordance with Figs. 5 and 6, the device retaining cover 3 on the body 1 is constituted by a bayonet device. The latter comprises, on the one hand, a bar 25 fixed on the rear face of cover 3, and of which the ends each present a beak 26 and, on the other hand, a flange 27 fastened to the tube 1 and comprising two notches or passages 28 of sufficient size to give passage to the beaks 26.

In order to place cover 3, it is sufficient to engage the beaks 26 under the flange 27, after having previously passed these beaks through the passages 28, and then to impart to cover 3 an angular displacement in the direction permitted by the locking device, up to a position defined by a stop 30. A joint 29, made of a flexible and elastic material makes the closing a tight one and keeps the beaks 26 in contact with the flange 27.

In order to remove cover 3, it is sufficient to perform the same operations but reversed, after having, by means of a key engaged in the lock 13, released the organs of the locking device.

Three embodiments of the safe box which is the object of the invention have been described here by way of example and in reference to the attached drawing, but it is obvious that all the described organs and elements can be replaced by their equivalents.

Thus, for instance, the cylinder lock could be replaced by a secret combination lock. The lock bolt could be replaced by one or several pawls, or by any other one way coupling of a known type, such as, for instance, as those including jamming organs. The body 1 need not necessarily have a tubular shape, but, on the contrary, can have any desired shape, but must be fitted with a circular opening.

I claim:

1. In a safe box construction, the combination, comprising, a body anchored to the ground, a cover, means partly on the body and partly on the cover and after rotation of the cover preventing axial motion thereof, a ratchet rigid with the body, a bolt slidingly guided on the inner side of the cover and having an end coacting with the ratchet and owing to such coaction resisting rotation of the cover in one direction and including a supporting face, a lock including a rotatable key-controlled part, a lever rigid with the rotatable lock part and engageable with the supporting face and by engagement therewith sliding the bolt from engagement with the ratchet.

2. The combination according to claim 1 and wherein the bolt is guided in a guide affixed to the inner side of the cover and having a cut-out to provide access of the lever to the supporting bolt face.

3. The combination according to claim 1 and wherein the means are threads.

4. The combination according to claim 1 and wherein the means includes an annular flange within the body and having diametrically opposed axial passages and a bar affixed to the inner side of the cover and having end beaks each movable through a passage.

ANDRÉ PROD'HOM.

REFERENCES CITED

The following references are of record in the file of this patent:

UNITED STATES PATENTS

| Number | Name | Date |
|---|---|---|
| 778,065 | Norvell | Dec. 20, 1904 |
| 1,416,179 | Ehrlich | May 16, 1922 |
| 1,625,652 | Grosbeck | Apr. 19, 1927 |
| 1,832,206 | Heffley | Nov. 17, 1931 |
| 1,853,427 | Hollister | Apr. 12, 1932 |